United States Patent
Chen et al.

(10) Patent No.: US 7,848,239 B2
(45) Date of Patent: Dec. 7, 2010

(54) NETWORK SYSTEM CAPABLE OF DYNAMICALLY CONTROLLING DATA FLOW AND ITS METHOD

(75) Inventors: Jin-Ru Chen, Hsin Chu (TW); Yi Lun Chen, Chang Hua (TW)

(73) Assignee: Realtek Semiconductor Corp., Hsinchu (TW)

( * ) Notice: Subject to any disclaimer, the term of this patent is extended or adjusted under 35 U.S.C. 154(b) by 387 days.

(21) Appl. No.: 11/730,550

(22) Filed: Apr. 2, 2007

(65) Prior Publication Data
US 2007/0230339 A1 Oct. 4, 2007

(30) Foreign Application Priority Data
Apr. 3, 2006 (TW) .............................. 95111754 A

(51) Int. Cl.
*H04J 1/16* (2006.01)
(52) U.S. Cl. .................................................. 370/235.1
(58) Field of Classification Search ......... 370/229–237, 370/351, 428, 429, 464, 465, 468
See application file for complete search history.

(56) References Cited
U.S. PATENT DOCUMENTS

| 5,539,729 A | | 7/1996 | Bodnar |
| 5,982,748 A | * | 11/1999 | Yin et al. ..................... 370/232 |
| 6,636,480 B1 | * | 10/2003 | Walia et al. .................. 370/229 |
| 7,006,437 B2 | * | 2/2006 | Ogier et al. ............... 370/230.1 |
| 2002/0136228 A1 | | 9/2002 | Miyamoto |
| 2004/0008625 A1 | * | 1/2004 | Lee et al. ..................... 370/229 |
| 2005/0041583 A1 | * | 2/2005 | Su et al. ...................... 370/235 |
| 2005/0068965 A1 | * | 3/2005 | Lin et al. ............... 370/395.21 |
| 2005/0141427 A1 | * | 6/2005 | Bartky ......................... 370/235 |
| 2007/0211626 A1 | * | 9/2007 | Gooch et al. ................. 370/229 |

FOREIGN PATENT DOCUMENTS

| TW | I246281 | 12/2005 |
| WO | WO 2004/008698 A2 | 1/2004 |
| WO | WO 2005/125123 A1 | 12/2005 |

* cited by examiner

*Primary Examiner*—Kwang B Yao
*Assistant Examiner*—Obaidul Huq
(74) *Attorney, Agent, or Firm*—Thomas, Kayden, Horstemeyer & Risley, LLP

(57) ABSTRACT

A network system capable of dynamically controlling a data flow is disclosed. The network system includes: a forwarding unit, for receiving a packet and for providing a QoS (quality of service) function; and a processor, for accessing data from the forwarding unit through an interface and setting at least one parameter of the forwarding unit. The interface is coupled between the forwarding unit and the processor, and the processor executes a software program to set the at least one parameter of the forwarding unit.

In this way, the forwarding unit can classify received packets into different QoS levels according to their transmission properties, and can provide different forwarding methods and QoS services to reduce the amount of the output queues physically.

19 Claims, 2 Drawing Sheets

NETWORK SYSTEM CAPABLE OF DYNAMICALLY CONTROLLING DATA FLOW AND ITS METHOD

BACKGROUND OF THE INVENTION

1. Field of the Invention

The present invention relates to a method of ensuring the quality of service of the network bandwidth, and more particularly, to a network system capable of dynamically controlling the data flow such that different bandwidths can be assigned according to different service classes when the number of physical queues is reduced.

2. Description of the Related Art

IETF (internet engineering task force) specifies two mechanisms, an integrated service (Intserv) and a differentiated service (Diffserv), to provide an appropriate service according to networks having different properties such that different streams (e.g. video streams or audio streams) can be transferred smoothly.

In the Diffserv, six bits of TOS (Type of Service) in the IP header are utilized to indicate different service classes. The above-mentioned six bits are differentiated service code point (DSCP). If the service provider intends to provide different traffics corresponding to different qualities of service (QoS), the service provider sets a specific DSCP in the header as each DSCP represents a specific service class and a corresponding operation. Moreover, in a DiffServ model, different DSCPs correspond to different packet forwarding methods called PHB (Per-hop Behavior) in a router, and the packet is divided into three PHBs according to its traffic property. The three PHBs are as follows:

1. Expedited Forwarding (EF) PHB;
2. Assured Forwarding (AF) PHB; and
3. Best Effort (BE) PHB.

The above-mentioned PHBs represent three different service classes respectively, where each class can be indicated by the aforementioned DSCP. Therefore, when a packet enters a Diffserv domain, an ingress router classifies and labels the packet by setting the DSCP in the DS field of the packet. Then, a core router in the Diffserv domain provides different forwarding methods and QoSs according to different service classes. As Diffserv only performs a classifying service on the packet, the core router does not additionally record forwarding information corresponding to each route of traffic. Thus, the packets cannot be efficiently managed in a conventional Diffserv domain.

In addition, take a conventional network system supporting Diffserv as an example, assuming that the network system supports at least six different service classes, where a highest class of the six service classes is an EF class and the second highest class is an AF class. The AF class is further divided into four different classes according to different traffic properties. The rest class (the lowest class) is a BE class. A forwarding unit 10 of the above-mentioned network system is shown in FIG. 1. The forwarding unit 10 at least includes a packet input end 11, a classifier 12, a plurality of (as many as the number of service classes) meters/droppers 13, a plurality of (as many as the number of service classes) output queue devices 14, and a packet output end 15.

The packet input end 11 receives packets from the network. The classifier 12 classifies the packets according to the traffic properties of the packets. The meter/dropper 13 measures the data flow of the packets and drops some packets when the queue is full or when some specified conditions are satisfied. At last, the output queue devices 14 perform queue management on the packets corresponding to different classes, and then the packet output end 15 outputs the packets.

According to the above disclosure, in a conventional network system supporting Diffserv, the physical output queue devices 14 have to be established as many as the number of the supported service classes. Therefore, it is not efficiency utilizing the aforementioned network.

SUMMARY OF THE INVENTION

In view of the above-mentioned problems, an object of the invention is to provide a network system and a method for dynamically controlling the data flow utilizing a software method to adjust parameters of a forwarding unit to reduce the amount of physical output queues instead of providing output queues as many as the service classes. The network system can still allow packets to be classified into different service classes according to their traffic properties and provide different forwarding methods and QoSs.

According to an embodiment of the present invention, a network system capable of dynamically controlling a data flow is disclosed. The network system comprises: a forwarding unit, for receiving a packet and providing a QoS (quality of service) function; and a processor, for reading data from the forwarding unit and setting at least one parameter of the forwarding unit. The interface is coupled between the forwarding unit and the processor, and the processor executes a software program to set the at least one parameter of the forwarding unit.

According to another embodiment of the present invention, a method for dynamically controlling a data flow is disclosed. The method comprises: receiving a packet; classifying the packet according to a traffic property of the packet; measuring a traffic flow of the packet to transfer the packet in a specific data flow rate; and transferring the packet in queues.

DETAILED DESCRIPTION OF THE INVENTION

The network system capable of dynamically controlling data flow and its method of the invention will be described with reference to the accompanying drawings.

Figure 1:
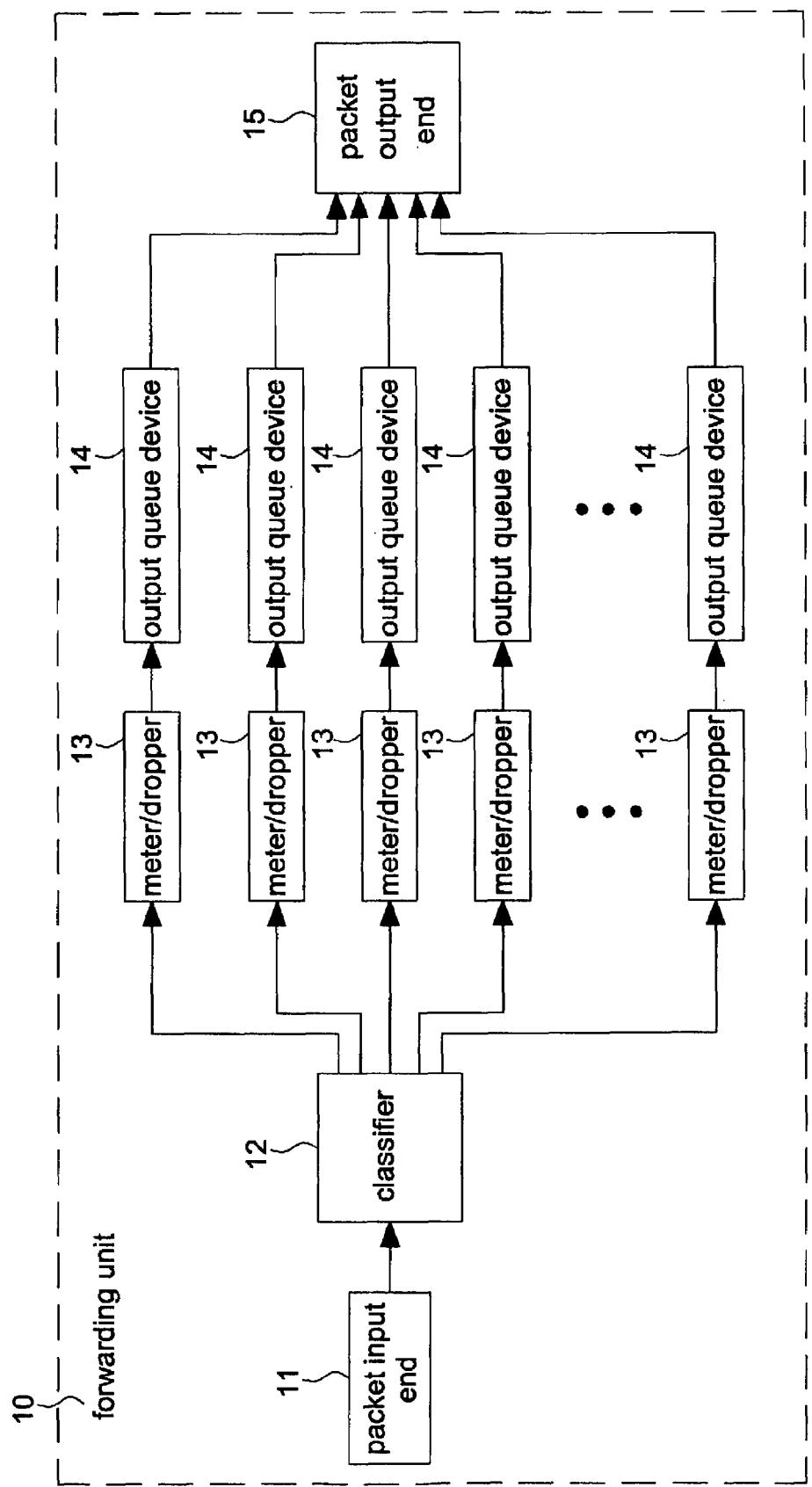
FIG. 1 shows a diagram of a conventional network system.
Figure 2:
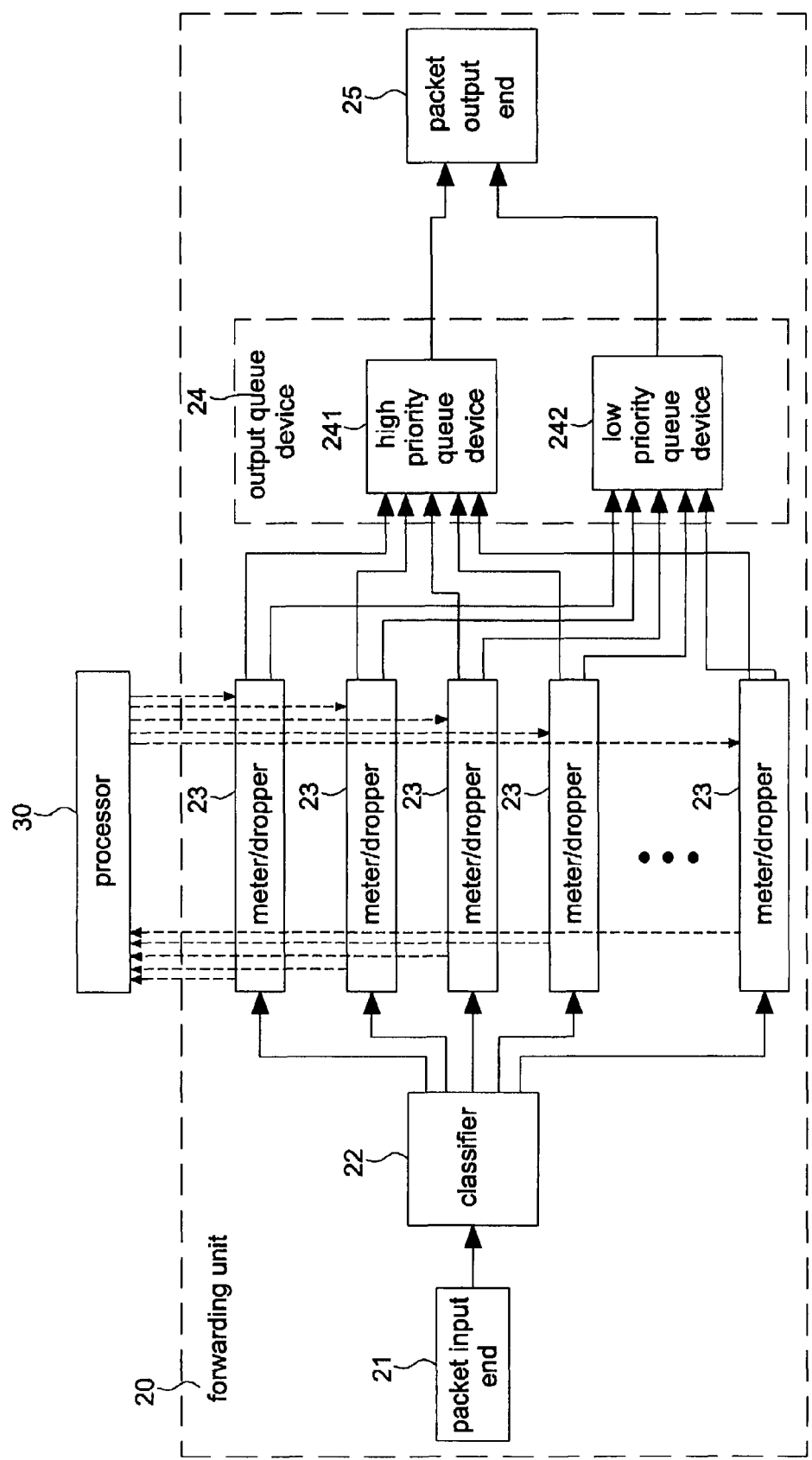
FIG. 2 shows a diagram of a network system according to an embodiment of the present invention.

FIG. 2 shows a network system according to an embodiment of the present invention. The network system includes a forwarding unit 20 and a processor 30, where the processor 30 is coupled to the forwarding unit 20 via an interface. The software executed by the processor 30 allows the forwarding unit 20 to be set or data to be accessed from the forwarding unit 20. The forwarding unit 20 includes a packet input end 21, a traffic classifier 22, meters/droppers 23, an output queue device 24 and a packet output end 25.

First, the packet input end 21 receives packets from the network. The traffic classifier 22 classifies the packets according to the traffic properties of the packets. In an embodiment of the present invention, the traffic classifier 22 classifies the packets according to the characteristics of the packets.

In addition, the meter/dropper 23 is utilized to provide a meter mechanism. In an embodiment of the present invention, each of the meters/droppers 23 includes a rate limit unit. The meters/droppers 23 measure the data flow of the received packets. Please note that the number of meters/droppers 23 is the same as the number of service classes provided by the traffic classifier 22, and which limits the packets having different traffic properties to be transferred in a specific data flow rate set by a corresponding rate limit unit. Please note that the rate limit unit can be a rate limit table. More specifically, the rate limit unit dynamically adjusts each meter entry according to measured traffic flow of each meter entry. For example, in an embodiment, a leaky bucket method is utilized to perform the meter control. Then, the processor 30 can set the number of tokens in the leaky bucket and read the number of left token to derive needed data flow rate (traffic). Please note that the processor 30 can also set the parameters of the classifier 22 to control the data flow rate (traffic).

In an embodiment of the present invention, the received packets may be classified into real-time streams, assured forwarding (AF) streams, and best efforts (BE) streams. Please note that the real-time stream of this embodiment is an expedited forwarding (EF) stream. The forwarding unit 20 includes physical output queue device 24 supporting the above-mentioned three types of data streams. The output queue device 24 includes a high priority queue device 241 and a low priority queue device 242. In an embodiment, the scheduling method of the packets adopts a strict priority method. In the strict priority method, when the high priority queue device 241 has packets to be transferred, in a next time available to transfer the packets, the packets corresponding to the high priority queue device 241 are firstly transferred.

Therefore, the number of data streams is only limited to the number of the meters 23. In this embodiment, the EF streams are placed into the high priority queue device 241, and the AF and BE streams are placed into the low priority queue device 242. In this way, the EF streams are transferred firstly, and the AF/BE streams are transferred through remained bandwidth. In this embodiment, the tasks specified by the software program executed by the processor 30 can be divided into two periods. The task of a short period is to refill the number of tokens of the meters 23. However, the task of the above-mentioned short period is not limited to be executed by the processor. In a physical implementation, the task of the above-mentioned short period can also be performed simply by hardware (such as the meters 23).

On the other hand, the task of the long period is to measure the data flow condition of each output queue device 24. For the AF/BE streams, there might be two processing procedures.

1. If the bandwidth demanded does not exceed the bandwidth originally-assigned, the bandwidth demanded can be met.

2. If the bandwidth demanded exceeds the bandwidth originally assigned, the bandwidth is distributed according to a rule similar to the rule of weighted-fair-queue (WFQ) to perform a queue management on the packets having different classes so that the packets can be transferred via the packet output end 25.

Please note that the scheduling way of the forwarding unit 20 and the procedure that the processor 30 performs the tasks are only regarded as an embodiment, not a limitation of the present invention.

In the following disclosure, a network system supporting EF and AF/BE streams according to an embodiment of the present invention is illustrated. Considering the EF streams, assume that a guaranteed bandwidth of the EF streams is X. If the data amount to be transferred does not exceed the guaranteed bandwidth X, the data amount can be transferred completely.

On the other hand, if the data amount to be transferred exceeds the bandwidth X, the exceeded data will be dropped by the dropper 23 to prevent other streams from being influenced.

For AF/BE streams, a predetermined bandwidth ratio is utilized. The bandwidths occupied by the data streams having different traffic properties comply with a predetermined bandwidth ratio. For example, assume that in the network system, three predetermined different traffic classes A/B/C are provided, and the corresponding bandwidth ratio is 2:3:5. At this time, if the outbound bandwidth of the forwarding unit 20 is 10 Mbps, the network system can perform the following process according to the rules described below.

1. Considering the packets received by the forwarding device 20, if the traffic of the packets complying with the BE streams A/B/C is full-loaded, the usage bandwidth distribution is:

A:B:C=2 Mbps:3 Mbps:5 Mbps.

2. Considering the packets received by the forwarding device 20, if the traffic of the packets complying with the BE streams A/B is both full-loaded and the traffic of the packets complying with the BE streams C is none, then the usage bandwidth distribution is:

A:B:C=4 Mbps:6 Mbps:0 Mbps.

3. Considering the packets received by the forwarding device 20, if the traffic of the packets complying with the BE streams A is full-loaded and the traffic of the packets complying with the BE streams B/C is both none, then the usage bandwidth distribution is:

A:B:C=10 Mbps:0 Mbps:0 Mbps.

In this embodiment, considering EF streams, the processor 30 determines that the limitation to the bandwidth of the meter 23 is the above-mentioned guaranteed bandwidth X, and the meter 23 includes a rate limit unit.

In this embodiment, considering AF/BE streams, the processor 30 determines the needed bandwidth of each data stream according to the predetermined bandwidth ratio and the proportion of the bandwidth physically occupied by each data stream. The meter 23 utilizes a method of refilling the number of tokens in a short time to averagely assign the tokens. Therefore, the processor 30 executes the operation of refilling the number of tokens in the short period.

On the other hand, in the long period task, the processor 30 continuously monitors the usage bandwidths of the AF/BE streams to derive the traffic variances. The processor 30 utilizes a software technique, such an example as linear prediction, to dynamically predict available bandwidths, which can be distributed to each traffic flow at a next time point of the network system. In this way, the processor 30 can set the meter 23 according to the predicted bandwidths, and different service classes can obtain appropriate bandwidths accurately and dynamically.

In the following disclosure, to illustrate the setting mechanisms performed by the processor 30 on the classifier 22 and the meter 23, assume that the total bandwidth of the network system is 12 Mbp. At first, the software program of the network system is set as follows.

1. Egress bandwidth is 12 Mbps.
2. A specific traffic flow "flow 1" is provided for EF streams, where the bandwidth of flow 1 is 2 Mbps, meaning that the guaranteed bandwidth is 2 Mbps.
3. Three specific traffic flows "flow 2", "flow 3", and "flow 4" are provided for AF streams. Flow 2, flow 3, and flow 4 utilize the remained 10 Mbps (subtract the guaranteed bandwidth 2 Mbps from the total bandwidth 12 Mbps).

Furthermore, the three specific traffic flows flow 2, flow 3, and flow 4 correspond to a predetermined bandwidth ratio:

flow2:flow 3:flow 4=4:3:2.

4. The traffic flow "BE" of the BE streams shares the bandwidth with the AF streams. The predetermined bandwidth ratio among the streams is:

flow2:flow 3:flow 4:BE=4:3:2:1.

Then, the setting of the hardware of the network system is described as follows.

1. Classifier 1: the classifier 1 is set according to the packet characteristic (such as source IP/destination IP/source port/destination port/port/VLAN ID) of the flow 1 to utilize the rate limit unit entry 1 for controlling the number of the tokens.

2. Classifier 2: the classifier 2 is set according to the packet characteristic (such as source IP/destination IP/source port/destination port/port/VLAN ID) of the flow 2 to utilize the rate limit unit entry 2 for controlling the number of the tokens.

3. Classifier 3: the classifier 3 is set according to the packet characteristic (such as source IP/destination IP/source port/destination port/port/VLAN ID) of the flow 3 to utilize the rate limit unit entry 3 for controlling the number of the tokens.

4. Classifier 4: the classifier 4 is set according to the packet characteristic (such as source IP/destination IP/source port/destination port/port/VLAN ID) of the flow 4 to utilize the rate limit unit entry 4 for controlling the number of the tokens.

5. Classifier 5: This rule is utilized to monitor "BE", meaning that all the rest traffic, which does not comply with the above four rules, is monitored by this rule. In other words, this rule is a default rule. For example, if the IP packet complies with this rule, the rate limit unit entry 5 is utilized for controlling the number of tokens.

Assume that the processor 30 executes a reassignment operation per second. In this way, the processor 30 of the network system executes the following steps according to the software program:

calculating needed number of tokens according to the total egress bandwidth 12 Mbps, and then obtaining the needed number of tokens per second, 12M;

first, arranging the tokens to the flow 1 (because the flow 1 is corresponding to the guaranteed bandwidth), and setting the number of tokens of the rate limit unit entry 1 as 2M according to the needed bandwidth 2 Mbps, where 2M tokens are needed per second to transfer the packet, and the number of the remained tokens becomes 12M−2M=10M;

then, assigning the tokens to the other traffic flows flow2, flow3, flow4, and BE, where if the numbers of the remained tokens of the rate limit unit entries 2/3/4/BE are respectively 2M/0/0/0, the flow 2 has 2M tokens not utilized in the last second, and the flow 3, flow 4, and BE consume all tokens in the last second, and therefore, if the processor 30 recalls that the token distribution on flow 2/flow 3/flow 4/BE in the last second is 4M/2M/1M/3M, it can be derived that the actual traffic flows of flow 2/3/4/BE are respectively 2 Mbps/at least 2 Mbps/at least 1 Mbps/at least 3 Mbps;

for flow 2, the actual usage bandwidth in the last second being 2 Mbps, and therefore, the processor 30 refilling the number of tokens corresponding to 2M to the rate limit unit entry 2 for a next second, and after assigning tokens to Flow 2, the number of the remained tokens becoming 10M−2M=8M;

the processor 30 distributing the remained 8M bandwidth to the flow 3, flow 4, and BE according to the above-mentioned bandwidth ratio 3:2:1, and therefore, flow 3, flow 4, and BE respectively obtaining 4M, 2.66M, and 1.33M tokens such that the numbers of tokens of each of the rate limit unit entries 3, 4, and 5 can be set according to the above-mentioned numbers 4M, 2.66M, and 1.33M, where there are still tokens left (for example, there are 8M−4M−2.66M−1.33M=0.01M tokens left), which can be selectively arranged to BE.

In the conventional network system, six different output queue devices and corresponding settings (such as the ratio of WFQ) should be established to support one guaranteed bandwidth service class and five corresponding bandwidth service classes. In addition, if more service classes are supported, more physical queues should be provided. However, in the present invention, only two physical output queue devices 24, the high-priority queue device 241 and low priority queue device 242, need to be provided. The present invention utilizes the processor 30 and the software program to classify packets into different service classes according to their traffic characteristics to achieve the same purpose.

In contrast to the prior art, the present invention network system and method can still provide different transmission managements and monitoring operations according to traffic characteristics of the received packets without providing more physical queue devices. Therefore, the present invention ensures the quality of service and reduces the cost of physical devices, and utilizes hardware cooperating with software to achieve the purpose of arranging different bandwidth according to different service classes. Please note that the present invention method can be also utilized in a differentiated service network system.

While certain exemplary embodiments have been described and shown in the accompanying drawings, it is to be understood that such embodiments are merely illustrative of and not restrictive on the broad invention, and that this invention should not be limited to the specific construction and arrangement shown and described, since various other modifications may occur to those ordinarily skilled in the art.

What is claimed is:

1. A network system capable of dynamically controlling a data flow, the network system comprising:
    a forwarding unit for receiving a packet and for providing a QoS (quality of service) function including:
        at least one classifier for classifying the packet according to a traffic property of the packet;
        at least one meter for measuring a traffic flow, wherein the at least one meter includes a rate limit unit for dynamically adjusting each meter entry according to measured traffic flow for each meter entry, wherein the at least one meter utilizes a leaky bucket to perform meter control; and
        at least one queue device for transferring the packet; and
    a processor for accessing data flow information from the at least one meter within the forwarding unit through an interface and setting at least one parameter of the forwarding unit;
    wherein the interface is coupled between the forwarding unit and the processor, and the processor executes a software program to set the at least one parameter of the forwarding unit, and wherein the processor sets a number of tokens in the leaky bucket and reads a number of remaining tokens to control traffic flow.

2. The network system of claim 1, wherein the processor sets at least one parameter of the classifier to control the traffic flow of the network system.

3. The network system of claim 2, wherein the classifier classifies the packet according to a characteristic of the packet.

4. The network system of claim 1, wherein the processor sets at least one parameter of the meter to control the traffic flow of the network system.

5. The network system of claim 1, wherein the processor sets at least one parameter of the rate limit unit to control the traffic flow.

6. The network system of claim 1, wherein the processor refills the amount of the at least one token of the meter.

7. The network system of claim 1, wherein the packet is classified into a real-time stream, an assured forwarding stream, and a best effort stream, wherein the real-time stream is an expedited forwarding stream.

8. The network system of claim 7, wherein the real-time steam is an expedited forwarding stream.

9. The network system of claim 8, wherein the forwarding device comprises a high priority queue device and a low priority queue device.

10. The network system of claim 9, wherein the expedited forwarding stream is transferred by the high priority queue device.

11. The network system of claim 9, wherein the assured forwarding stream is transferred by the low priority queue device.

12. The network system of claim 9, wherein the best effort stream is transferred by the low priority queue device.

13. The network system of claim 7, wherein the forwarding device schedules the packet by a strict priority method.

14. The network system of claim 7, wherein the forwarding device transfers the real-time stream, the assumed forwarding stream, and the best effort stream according to a specific ratio.

15. The network system of claim 1, wherein the processor measures a traffic flow of each queue device.

16. A method for dynamically controlling a data flow, the method comprising:

receiving a packet;

classifying the packet according to a traffic property of the packet;

measuring a traffic flow of the packet with at least one meter, wherein measuring a traffic flow comprises utilizing a leaky bucket to measure the traffic flow of the packet, wherein the at least one meter includes a rate limit unit for dynamically adjusting each meter entry according to measured traffic flow for each meter entry, wherein the at least one meter utilizes a leaky bucket to perform meter control;

accessing data of said traffic flow from the at least one meter within a forwarding unit through an interface and setting at least one parameter of the forwarding unit;

processing said data;

setting a number of tokens in the leaky bucket and determining a number of remaining tokens in the leaky bucket to derive a needed data flow rate;

setting a parameter through said interface to transfer the packet in the needed data flow rate; and transferring the packet in queues.

17. The method of claim 16, wherein the rate limit unit is set by a processor executing a software program.

18. The method of claim 16, further comprising: classifying the packet into an expedited forwarding stream, an assured forwarding stream, and a best effort stream.

19. The method of claim 18, wherein the expedited forwarding stream is transferred in a high priority queue, and the assured forwarding stream and the best effort stream are transferred in a low priority queue.

* * * * *